United States Patent
Stingl

(10) Patent No.: US 6,895,150 B2
(45) Date of Patent: May 17, 2005

(54) CABLE CONTAINING OPTICAL TRANSMISSION ELEMENTS AND METHOD FOR THE PRODUCTION THEREOF

(75) Inventor: Andreas Stingl, Kronach (DE)

(73) Assignee: CCS Technology, Inc., Wilmington, DE (US)

( * ) Notice: Subject to any disclaimer, the term of this patent is extended or adjusted under 35 U.S.C. 154(b) by 50 days.

(21) Appl. No.: 10/258,764

(22) PCT Filed: Apr. 6, 2001

(86) PCT No.: PCT/DE01/01368

§ 371 (c)(1),
(2), (4) Date: Oct. 25, 2002

(87) PCT Pub. No.: WO01/84203

PCT Pub. Date: Nov. 8, 2001

(65) Prior Publication Data

US 2003/0099447 A1 May 29, 2003

(30) Foreign Application Priority Data

Apr. 28, 2000 (DE) .......................... 100 20 912

(51) Int. Cl.[7] .............................................. G02B 6/44
(52) U.S. Cl. ...................... 385/110; 385/100; 385/103; 385/105; 385/111; 385/113; 385/114
(58) Field of Search ..................... 385/100, 103–105, 385/110, 111, 113, 114

(56) References Cited

U.S. PATENT DOCUMENTS

| 5,542,020 | A | * | 7/1996 | Horska ........................ 385/112 |
| 6,141,472 | A | * | 10/2000 | Ishikawa et al. ............ 385/105 |
| 6,185,351 | B1 | * | 2/2001 | Daneshvar et al. ......... 385/114 |
| 6,212,321 | B1 | * | 4/2001 | Ishikawa et al. ............ 385/111 |
| 6,243,519 | B1 | * | 6/2001 | Ishikawa et al. ............ 385/111 |
| 2003/0049002 | A1 | * | 3/2003 | Bosisio et al. ............... 385/109 |

FOREIGN PATENT DOCUMENTS

| EP | 0703480 A1 | 3/1996 | ............ G02B/6/44 |
| EP | 0849616 A1 | 6/1998 | ............ G02B/6/44 |
| JP | 04055803 A | * 2/1992 | ............ G02B/6/44 |
| JP | 07234346 A | 9/1995 | ............ G02B/6/44 |
| JP | 08211262 A | 8/1996 | ............ G02B/6/44 |

* cited by examiner

*Primary Examiner*—Brian Healy
*Assistant Examiner*—Daniel Petkovsek

(57) ABSTRACT

A cable, and process for manufacture thereof, containing optical transmission elements. The cable having the following characteristics: a central element stretching in the direction of the cable longitudinal axis, where the central element has at least one slot open to the outside and where the slot runs on the outside of the central element in a helix or screw-like manner, with periodically changing rotation direction; several optical fiber ribbons arranged inside the slot in a stack, situated one above the other, where an additional equal lay stranding is applied to the SZ-stranding imposed by the slot path; and a single or multi-layer jacket surrounds the central element.

12 Claims, 12 Drawing Sheets

Figure 1:
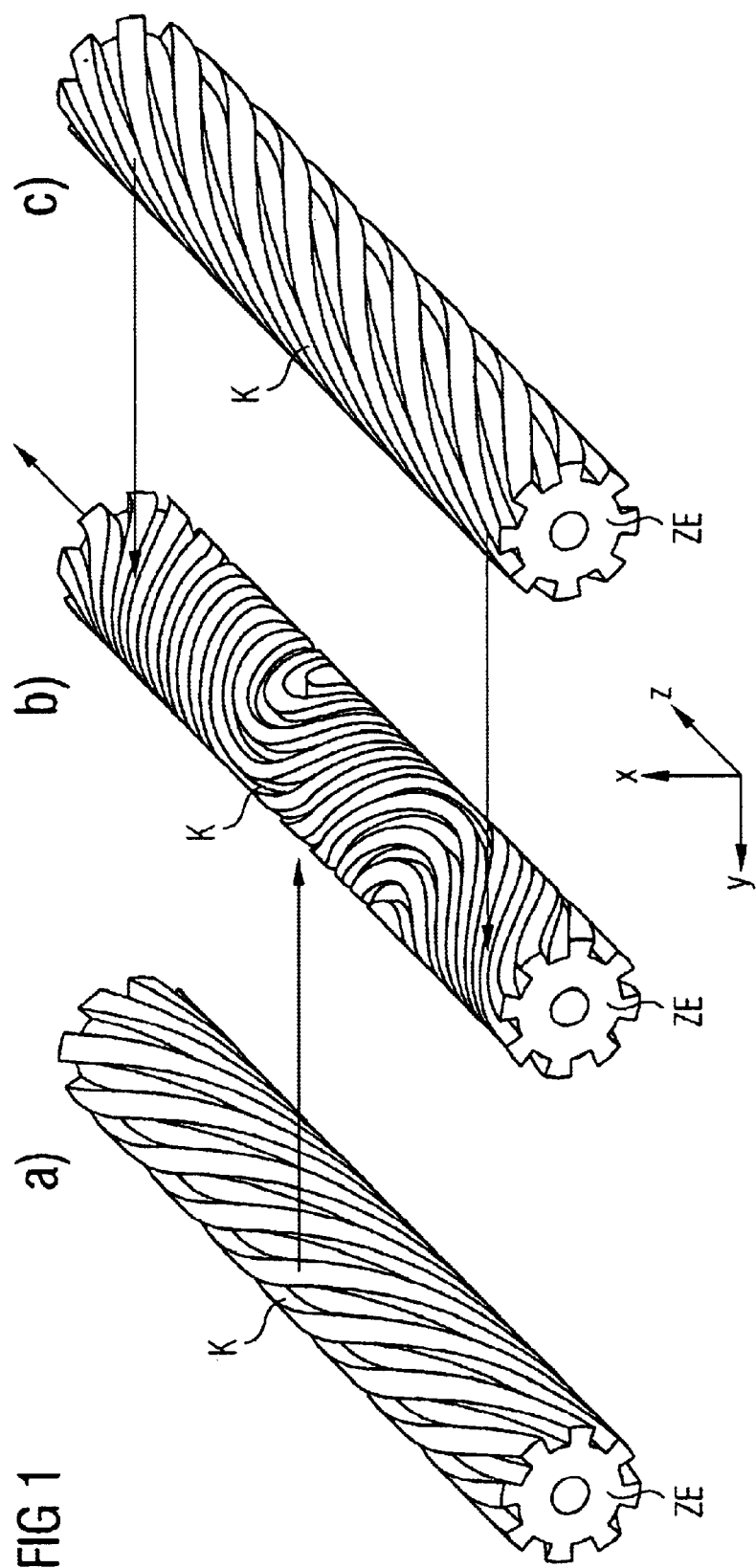

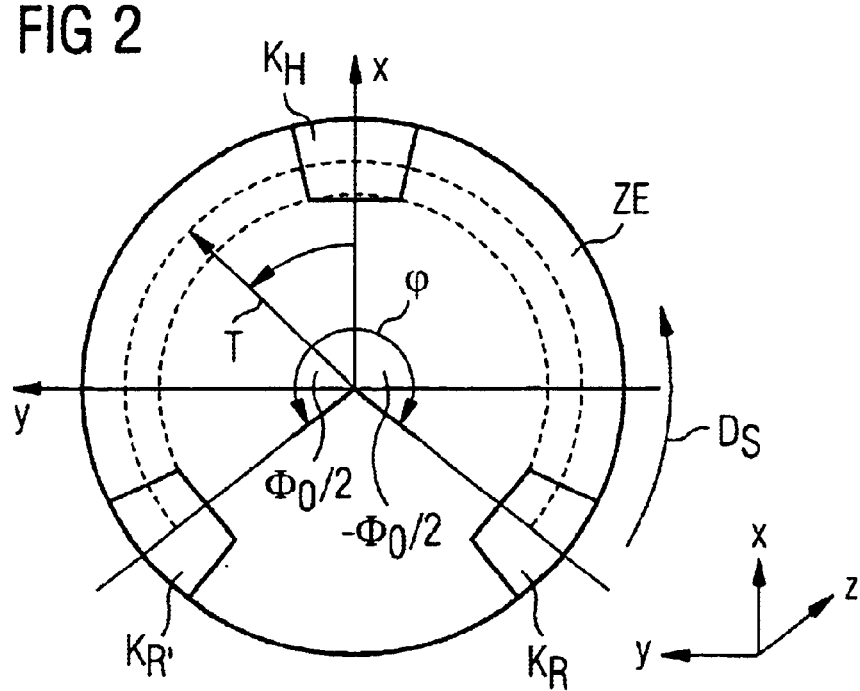
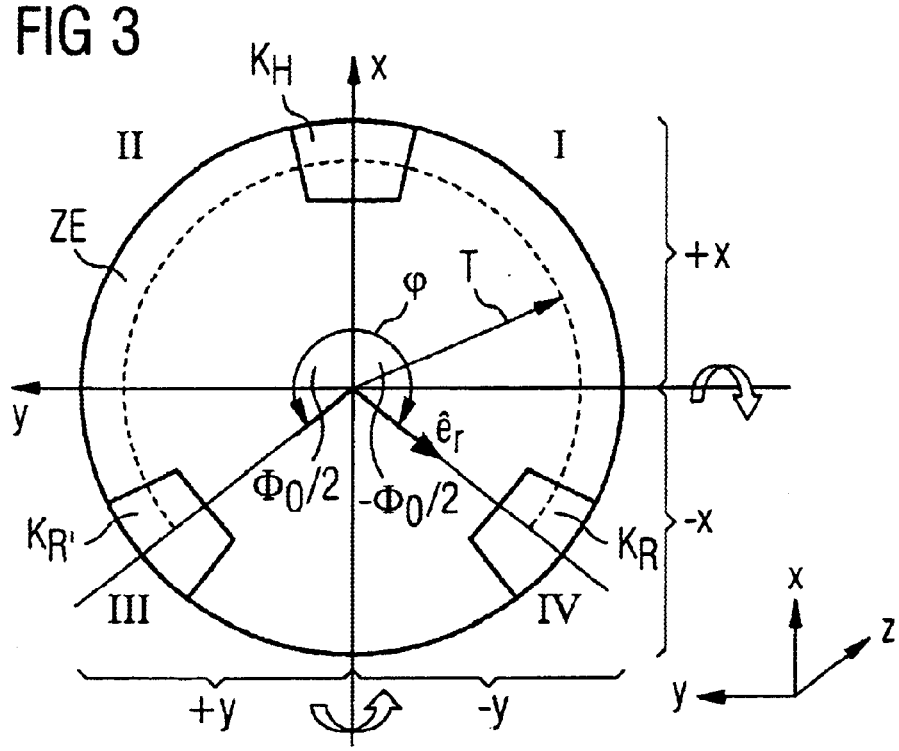

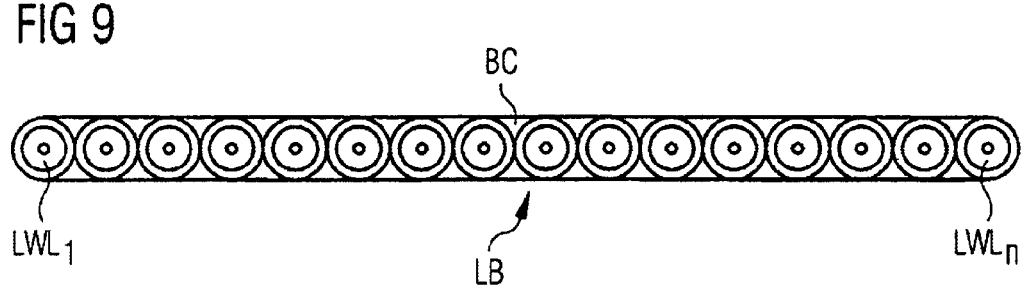
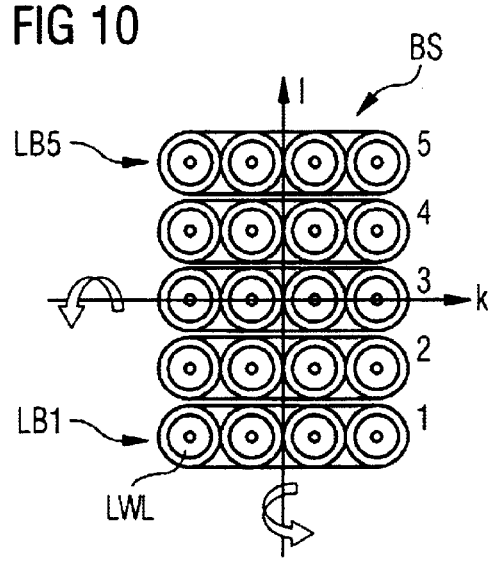

CABLE CONTAINING OPTICAL TRANSMISSION ELEMENTS AND METHOD FOR THE PRODUCTION THEREOF

FIELD OF THE INVENTION

The present inventions relate generally to the field of fiber optic cables and manufacturing methods thereof and, more specifically, to slotted core fiber optic cables.

BACKGROUND OF THE INVENTION

The slotted core cable developed more than 30 years ago distinguishes itself especially for its high tensile and compression resistance and its compact construction, in spite of the large number of the optical fibers arranged in the slots of the central element. Optical cables of this kind are f.e. described in U.S. Pat. Nos. 5,517,591 and 5,199,094.

An essential component of the slotted core cable is the cylindrical central element, on whose jacket several slots are located, each of them open to the outside, in the form of a helix or spiral, if need be with periodically changing rotation direction. The process for the manufacture of such a central element can be found in U.S. Pat. Nos. 4,997,258 and 5,380,472.

The invention concerns a cable containing an optical transmission element with a central element and optical fiber ribbons arranged in the slots of the central element. The invention also concerns a process for the manufacture of such a cable.

In order to increase the number of the optical fibers (LWL) serving as optical transmission elements, consisting of a glass core (refractive index $n_x$), a glass jacket (refractive index $n_m < n_x$) and a single or multi-layer protective covering (coating) in the slotted core cable, typically 8–16 optical fibers (LWL) are mechanically combined into a ribbon, and several of these ribbons are inserted into the slot of the central element one above the other in the form of a stack. U.S. Pat. Nos. 4,997,255 and 5,380,472 are especially relevant here. If the slot in the outer area of the central element describes a helix, whose rotation direction changes periodically, the optical fiber ribbons are twisted respectively, and thus subjected to a so-called SZ-stranding. The torsion thus produced in the optical fiber ribbons induces elastic forces, which cause the optical fiber ribbons in the slot to assume a preferred direction. Due to this alignment of the optical fiber ribbons in the slot the cable has two developed main axes with different bending behavior. This results in the following disadvantages:

a) The lengths of the individual optical fiber ribbons are not equally distributed onto the areas subjected to strain during bending of the cable. Especially the outer optical fiber ribbons of the stack are subject to high mechanical stresses, so that their signal attenuation is significantly increased due to micro and macro-bending.

b) The preferred alignment of the optical fiber ribbons leads to a mechanically unstable configuration at small bending radii. During bending of the cable, this can lead to spontaneous change in the order of the optical fiber ribbons in the cable. This also increases attenuation.

SUMMARY OF THE INVENTIONS

It is the objective of this invention to create a cable containing an optical transmission element, especially an SZ-stranded slotted core cable, with an improved bending behavior in relationship to signal attenuation. The components of the cable should be synchronized to each other or work together in such a way, that the cable has almost the same flexibility in all bending directions.

This objective is achieved by a cable containing an optical transmission element with the following characteristics:

it contains a central element stretching along the direction of the longitudinal cable axis, where the central element shows at least one slot open to the outside, and the slot runs on the outside of the central element helically or screw-like, with periodically changing rotation direction;

several optical fiber ribbons, arranged over each other in the form of a stack, serve as transmission elements, where an additional equal lay stranding is added to the SZ-stranding caused by the slot rotation;

a single or multi-layer jacket surrounds the central element.

A process for the manufacture of such a cable containing an optical transmission element consists of the execution of the following steps:

provision of a central element, where the central element shows at least one slot open to the outside and the slot running on the outside of the central element helically or screw-like, with a changing rotation direction;

payoff of the optical fiber ribbons serving as optical transmission elements from respective storage reels, combining the optical fiber ribbons into a stack;

insertion of the ribbon stack rotating around its longitudinal axis with a constant speed into the slots, and application of a single or multi-layer jacket.

The dependent claims give constructions and advantageous developments of the cable or the manufacturing process, respectively.

The preferred construction of the optical fiber ribbons in the slots can be avoided, by adding an additional stranding to the SZ-stranding caused by the rotation of the slots. This results in the following advantages:

the cable does not have a well-defined main axes with different bending behavior;

the flexibility of the cable is clearly improved;

for all optical fiber ribbons of the stack, the length of the tensile stressed segments always corresponds to the length of the compression stressed segments;

during bending of the cable, no spontaneous rearrangement of the optical fiber ribbons in the slot occurs.

BRIEF DESCRIPTION OF THE DRAWING FIGURES

Figure 4:
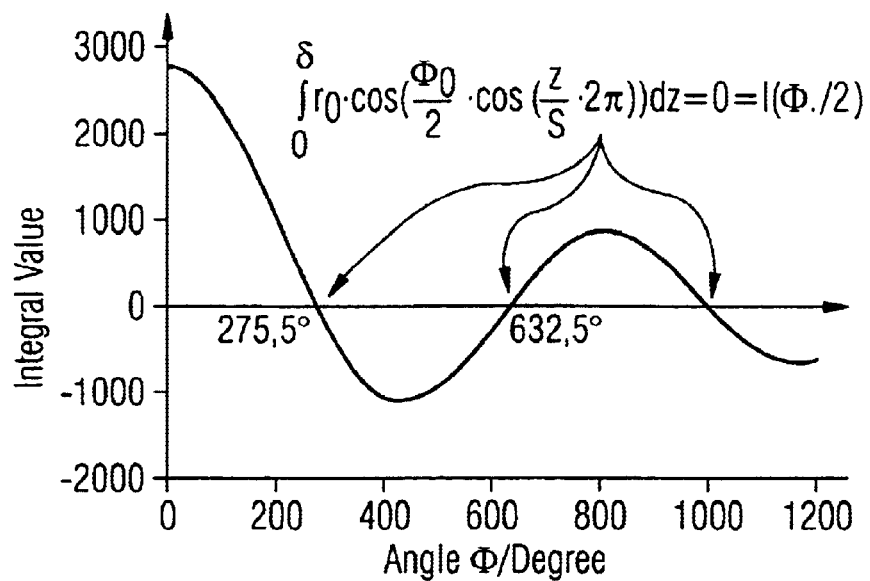
Figure 5:
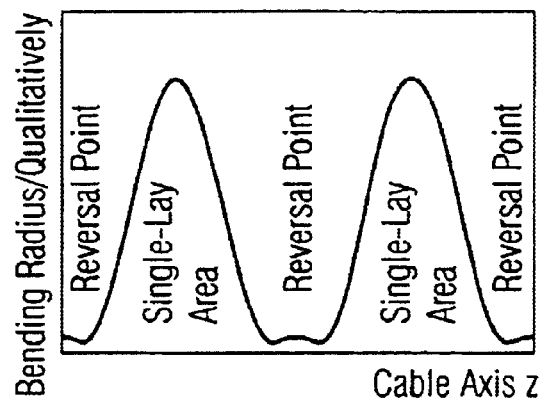
Figure 6:
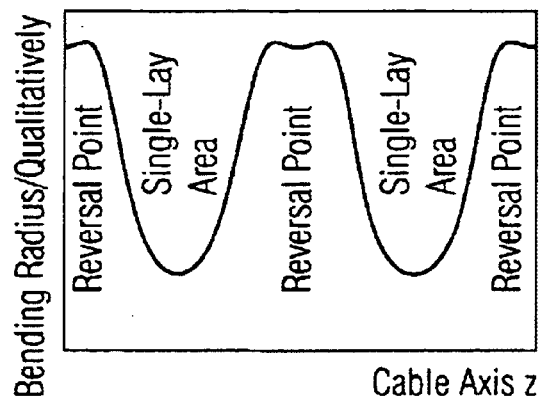
Figure 7:
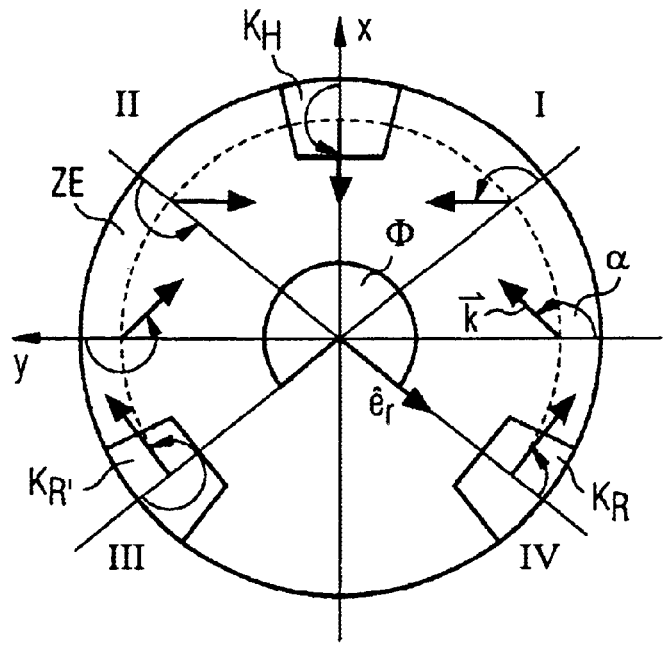
Figure 8:
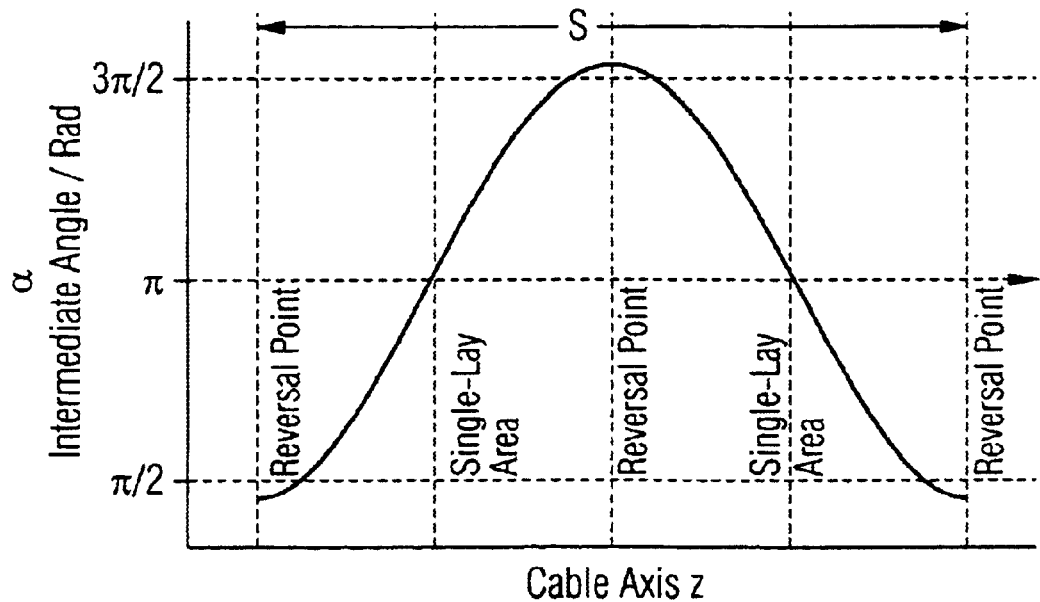
Figure 11:
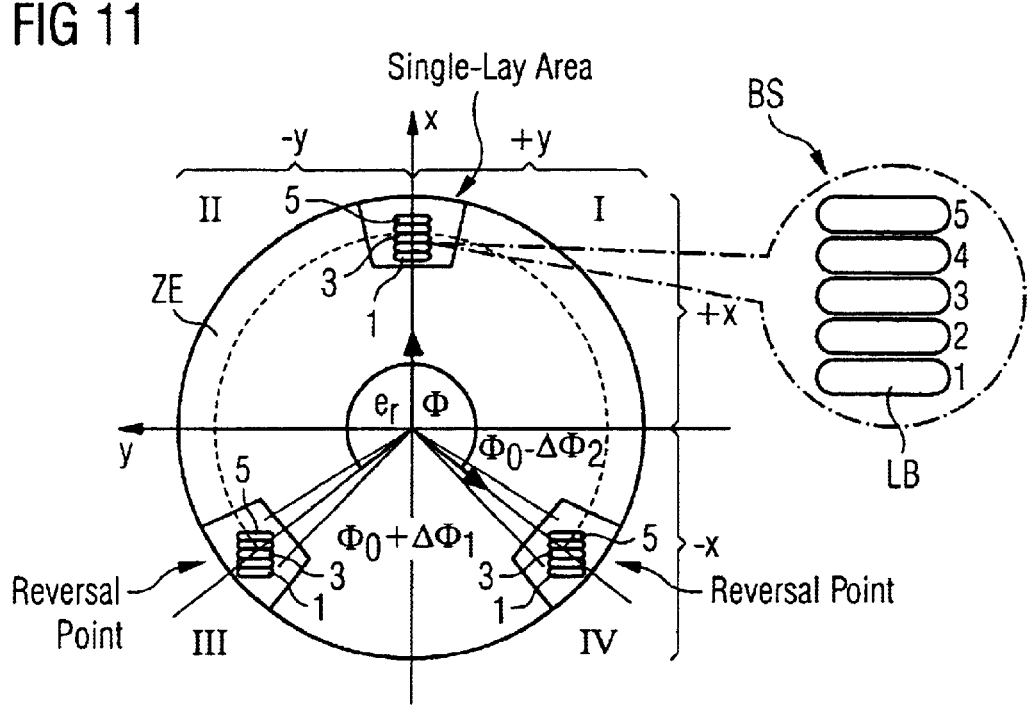
Figure 12:
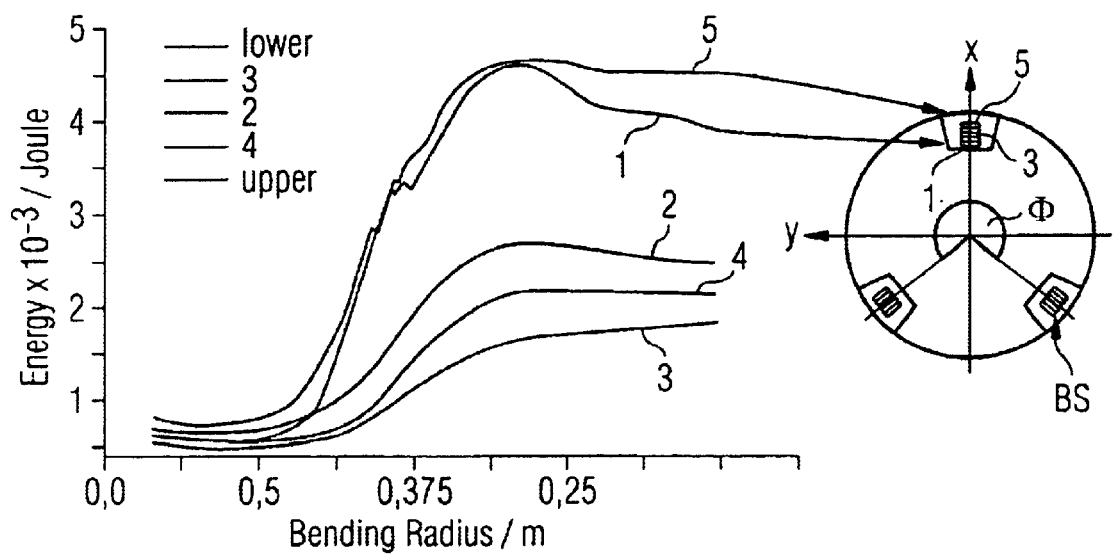
Figure 13:
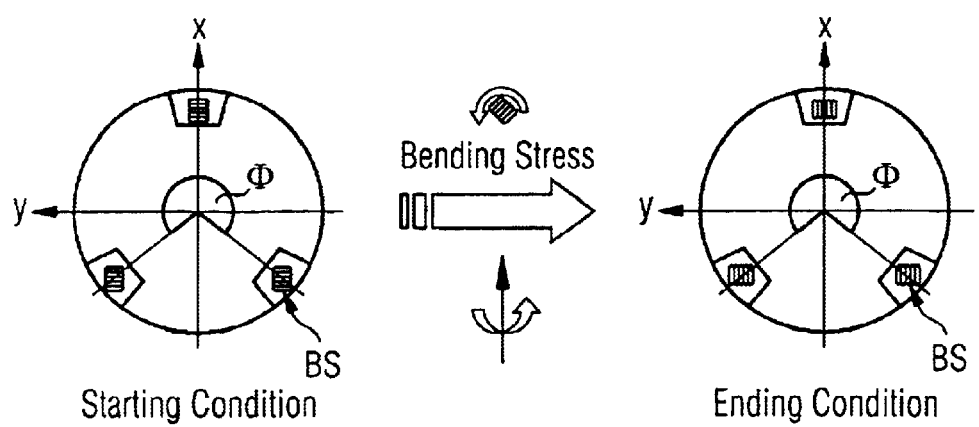
Figure 14:
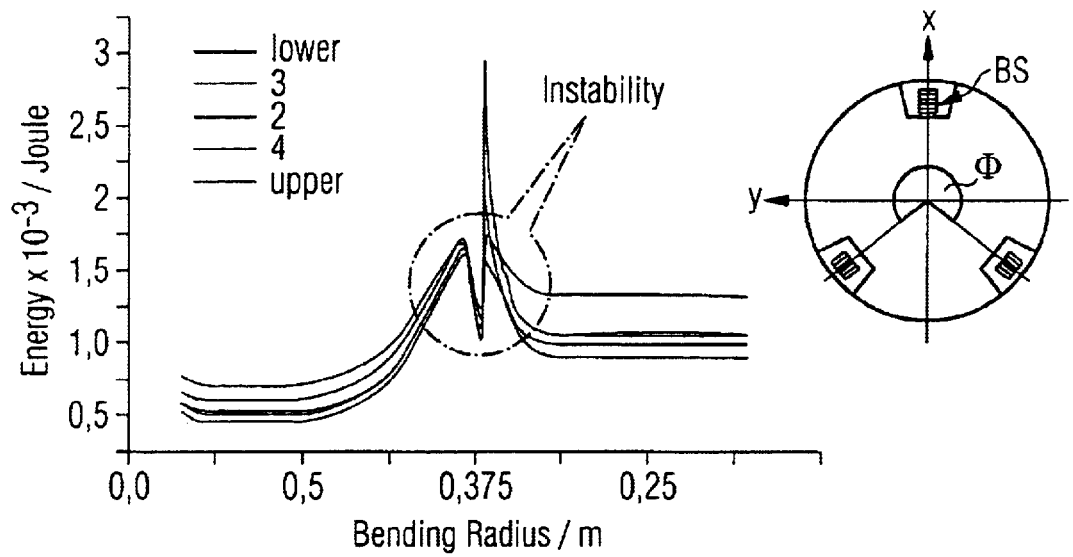
Figure 15:
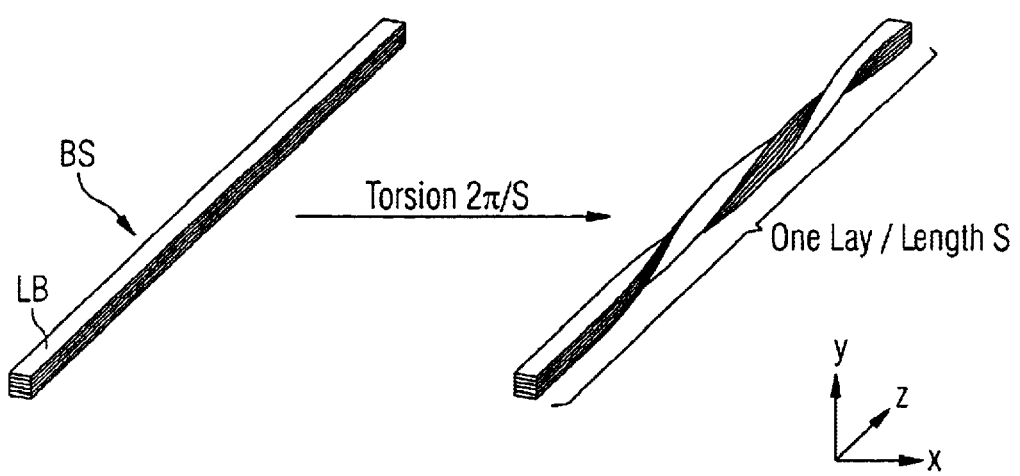
Figure 16A:
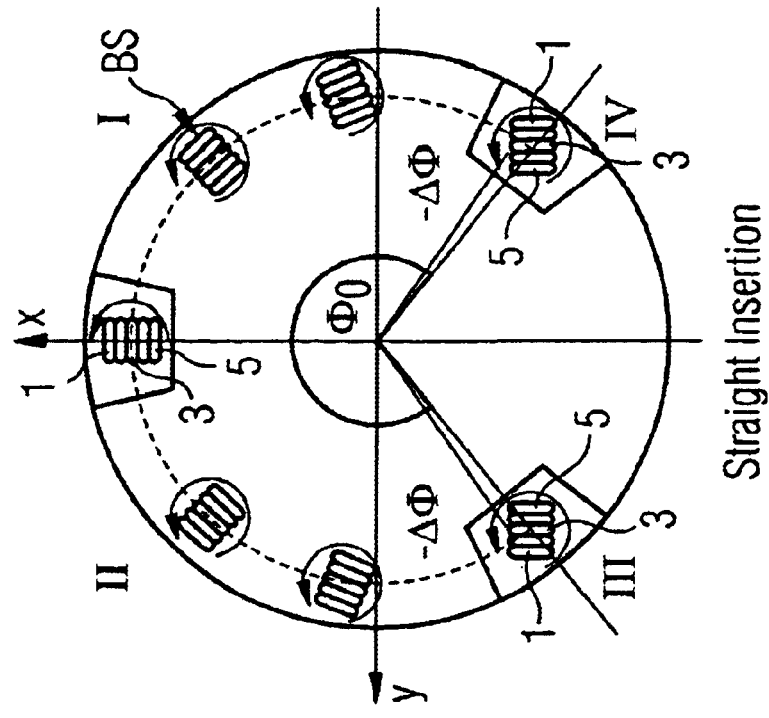
Figure 16B:
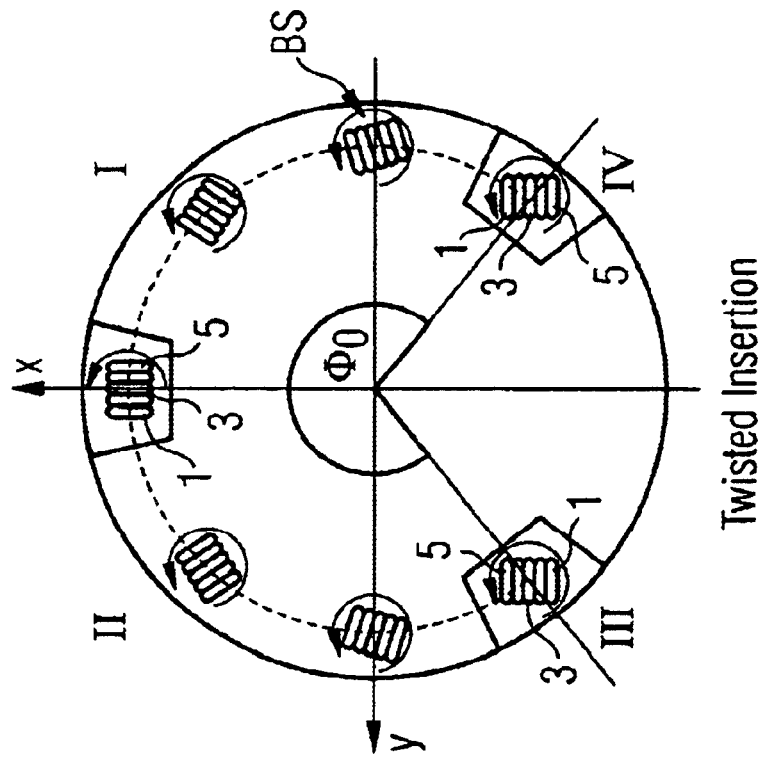
Figure 17:
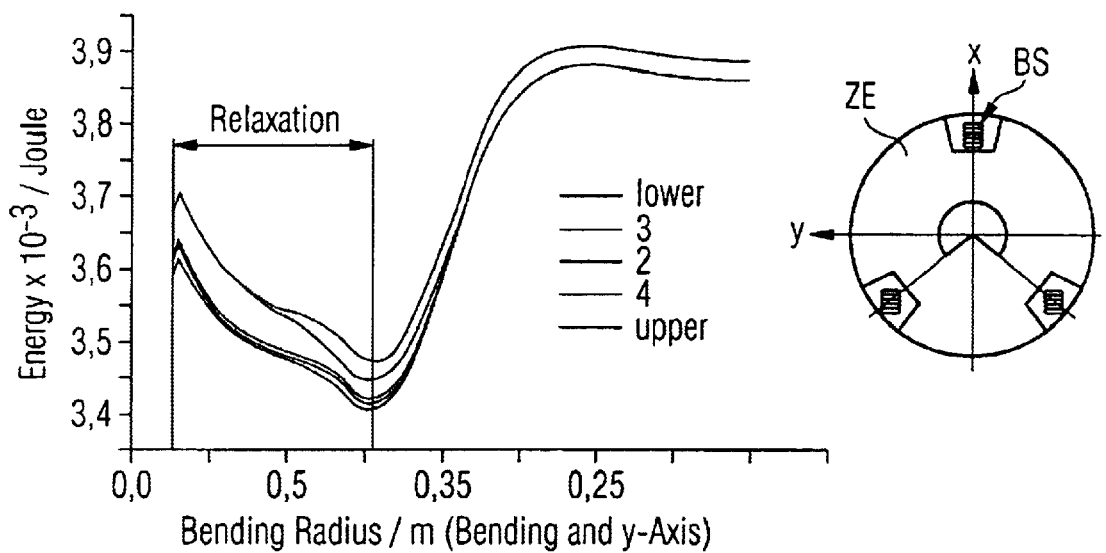
Figure 18:
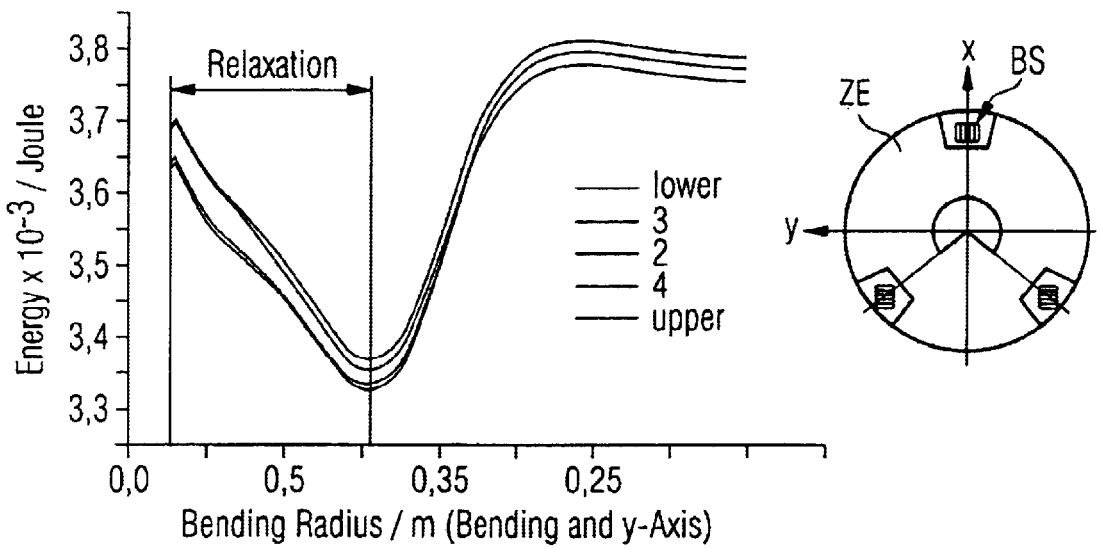
Figure 19:
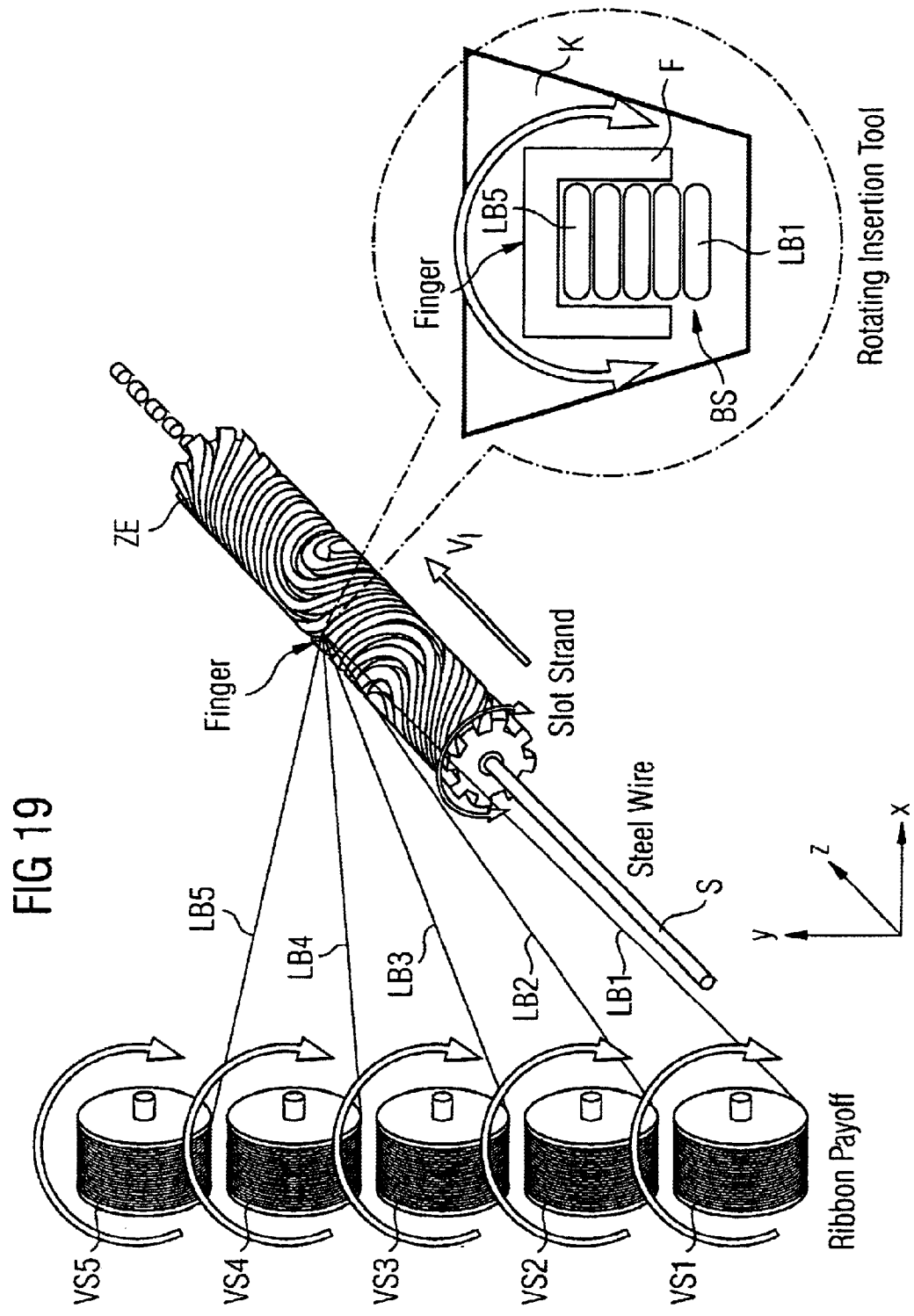
Figure 20:
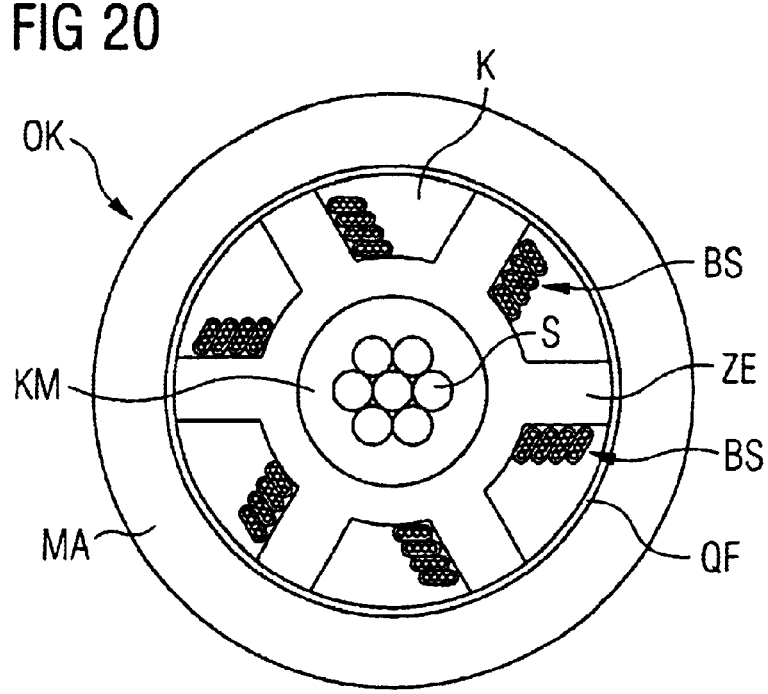

In the following the invention is more clearly explained by means of construction samples and their respective drawings. Shown are:

FIG. 1 central element with different slot arrangements, which give the inserted ribbons an S-stranding (FIG. 1a), an SZ-stranding (FIG. 1b) and a Z-stranding;

FIG. 2 the projection of a selected slot onto the cross-section surface of the central element a various points of the cable longitudinal axis (=longitudinal axis of the central element) between adjacent reversal points;

FIG. 3 the projection shown in FIG. 2 of the slot on the cross-section surface of the central element, as well as the two orthogonal bending axes;

FIG. 4 the graph of the Bessel function $J_0(\Phi_0/2)$ of zero power and its zero points corresponding to the ideal reversal angles $\Phi_0$;

FIG. 5 the location relationship of the curving of the spherical curvature along the cable axis connecting the center points of the slot;

FIG. 6 the location relationship corresponding to FIG. 5 of the curving radius along the cable axis;

FIG. 7 the projection of the curving vector of the spherical curvature connecting the center points of the slot onto the cross-section surface of the central element at various points of the cable axis between adjacent reversal points;

FIG. 8 the location relationship of the angle enclosed by the curving vector and the radial unit vector at various points of the cable axis between adjacent reversal points;

FIG. 9 an optical fiber ribbon in cross-section;

FIG. 10 several optical fiber ribbons combined into a stack in cross-section;

FIG. 11 the location of the ribbon stack within the slot, at various positions between adjacent reversal points;

FIG. 12 the shear or elongation energy accumulating in the SZ-stranded optical fiber ribbons during a bending of the central element around the y-axis relative to the bending radius;

FIG. 13 the location of the ribbon stack within the slot before and after a bending of the central element around the x-axis;

FIG. 14 the shear or elongation energy accumulating in the SZ-stranded optical fiber ribbons of the stack during a bending of the central element around the x-axis in relationship to bending radius;

FIG. 15 the elongated ribbon stack and the ribbon stack twisting around its longitudinal axis at an angle of $2\pi$ per SZ lay length;

FIG. 16 the location of the SZ-stranded of a ribbon stack additionally twisted around its longitudinal axis within the slot at various points of the cable longitudinal axis between adjacent reversal points, in case the ribbon stack inserts rotating (FIG. 16a) or straight, respectively (FIG. 16b);

FIG. 17 the shear or elongation energy accumulating in the SZ-stranded optical fiber ribbons of the stack which are additionally twisted around their longitudinal axis during a bending of the central element around the y-axis in relationship to the bending radius;

FIG. 18 the shear or elongation energy accumulating in the SZ-stranded optical fiber ribbons of the stack which are additionally twisted around their longitudinal axis during a bending of the central element around the x-axis in relationship to the bending radius;

FIG. 19 the ribbon payoff and the insertion tool of a line for the manufacture of an SZ-stranded slotted core cable with additional lay;

FIG. 20 a construction sample of a slotted core cable in cross-section; and

Figure 21:
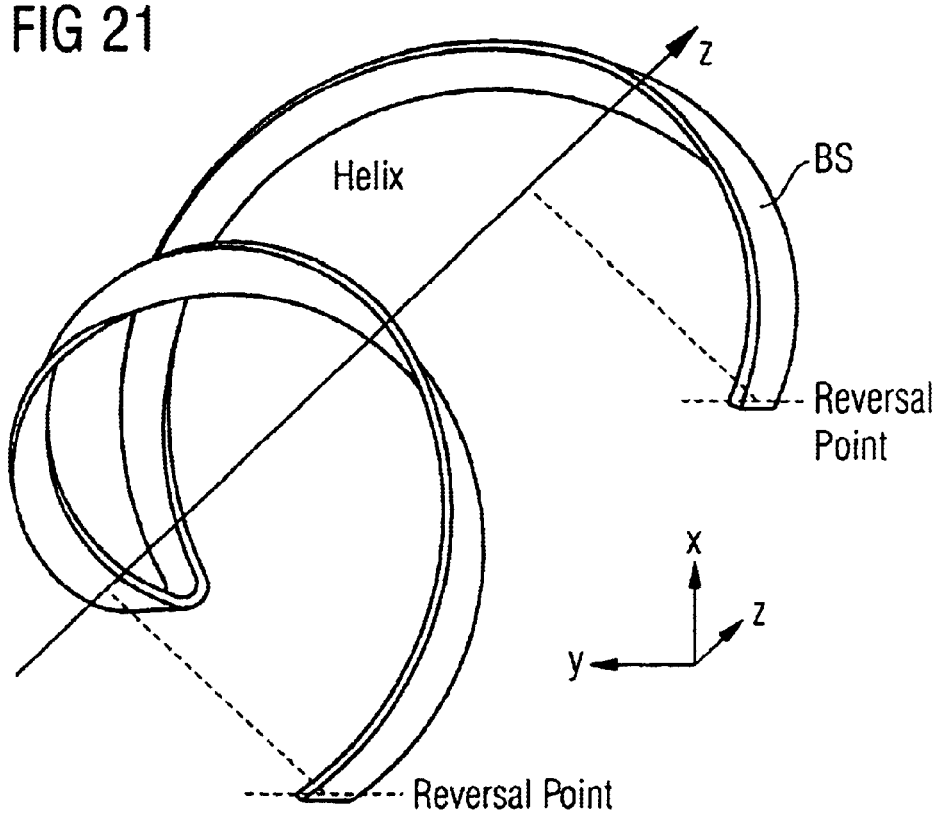

FIG. 21 the spatial path of the SZ-stranded ribbon stack provided with an additional stranding (torsion at $2\pi/S$) between adjacent reversal points.

DETAILED DESCRIPTION OF THE INVENTIONS

A) The Central Element

The path of the slots in the central element determines the type of stranding of the optical fiber ribbons inserted in the slots and following the slot strand. Basically, there is a normal stranding with equal lay (S- or Z-stranding) and the so called reverse lay (SZ-stranding). The central elements ZE effecting the respective stranding of the optical fiber ribbons are shown in perspective in FIG. 1. The 8 slots K of the cylindrical central element ZE shown in FIG. 1a each describe a helix or spiral (S-stranding of the optical fiber ribbons) turning left in the direction of the cable longitudinal axis, i.e. the longitudinal axis of the central element ZE, the slots K of the central element ZE shown in FIG. 1b a helix or spiral (Z-stranding of the optical fiber ribbons) turning right in the direction of the cable longitudinal axis, i.e. the longitudinal axis of the central element ZE. In order to subject the optical fiber ribbons to an SZ-stranding, the slots K depicted in FIG. 1b must show the nearly harmonic path (sine or cosine) depicted in FIG. 1b on the periphery of the central element. This path happens by changing the rotation direction of the helix f.e. after a certain number N of rotations, maintaining this rotation direction for the following N-rotations, and then again proceeding in the original rotation direction. Therefore S-stranded and Z-stranded segments ("helicals") follow periodically on the jacket surface of the central element. Between adjacent segments of "equal lay stranded" segment there is always a transition area described as "reversal".

b) Coordinate System and Parameterization

For the following discussion, the examination of the f.e. eight slots K present in the cylindrical central element ZE and mostly parallel running is sufficient. In FIG. 2 a projection of such a slot at various points of the cable longitudinal axis between successive reversal points in the xy-level of the accompanying coordinate system is depicted. The location of the chosen slot at the two reversal points (slot cross-sections $K_S$ and $K_R$ as well as the location of the slot in the center of the equal lay segments (slot cross-section $K_H$) are emphasized. The dash line should symbolize the location of the slot center at the other points of the examined axis segment. The arrow designated as $D_S$ indicated the rotation direction of the slot path.

Due to the geometry of the central element ZE a cylindrical coordinate system for mathematical description of the slot path is available. The x-axis defining the angle zero point of the coordinate system runs preferably through the center of the slot cross-section $K_H$ assigned to the helical, so that the slot cross-sections $K_R$ and $K_3$ are located symmetrically to the x-axis. The angle $\Phi$ describing the azimuthal location of the slot in the y-level has the value $\Phi_R = \Phi_0/2$, $\Phi_H = 0$ and $\Phi_3 = \Phi_0/2$ for the slot segments $K_R$, $K_N$, and $K_H$. The longitudinal axis of the central element ZE forms the z-axis of the coordinate system.

In the construction sample shown, the so-called reversal angle $\Phi_0$ is less than 360°, i.e. the slot strand rotating to the left does not rotate completely on the jacket surface of the central element ZE between subsequent reversal points.

The following examines more closely not the real path of the spatially elongated slot which is difficult to describe mathematically, but only the spherical curve connecting the center of the slot and described by the tip of vector Z. The vector T swinging periodically in an angle $\Phi$ with the maximum values $\Phi_{max} = \pm\Phi_0/2$ around the x-axis has a constant length of $r_0$, so that the parameterization of the spherical curvature connecting the centers of the slot is as follows in cylinder coordination:

$$T(z)_{r\phi} = \left(\frac{\Phi_0}{2} \cdot \cos_z^{r_0}\left(\frac{z}{S} \cdot 2\pi\right)\right) \tag{1}$$

where $r_0$, $\Phi_0$, S have the following meaning:

$r_0$: constant radial distance to z-axis $\Phi_0$: reversal angle

S: laylength (double the axial distance of adjacent reversal points)

With $x=r_0\cos(\Phi)$ and $y=r_0\sin(\Phi)$ the curve can be depicted in cartesian coordinates as:

$$T(z)_{xy} = \begin{bmatrix} r_0 \cdot \cos\left(\Phi_0/2 \cdot \cos\left(\frac{z}{S} \cdot 2\pi\right)\right) \\ r_0 \cdot \sin\left(\Phi_0/2 \cdot \cos\left(\frac{z}{S} \cdot 2\pi\right)\right) \\ z \end{bmatrix} \quad (2)$$

The spherical curvature connecting the slot center points, also designated as stranding curvature in the following, is therefore designated as one-dimensional in z, in cylinder coordinates as well as in Cartesian coordinates.

c) Ideal Reversal Angle $\Phi_0$

The reversal angle $\Phi_0$ describes the azimuthal distance of the slot cross-sections $K_S$ and $K_R$ assigned to adjacent reversal points in the xy-level. In order to guarantee the flexibility of the central element ZE and thus also of the cable, equal length of an optical fiber has to be in the compression and tensile stress areas of the cable during equal bending around a given axis. This condition is always met for cables stranded with equal lay, but for SZ-stranded cables only for discrete values of the reversal angle $\Phi_0$.

Now the bending of the central element ZE around the x-axis as bending axis as depicted in FIG. 3 is examined. In this case, independent from the reversal angle $\Phi$, equal length of the stranding curvature on the positive and negative segment of the y-axis is located, so that the length of the compression stressed fiber segments corresponds to the length of the tension stressed fiber segments.

A bending of the central element ZE around the y-axis has the consequence, that the relationship of the length of the stranding curvature located in the positive segment of the x-axis and the length of the stranding curvature located in the negative segment of the y-axis constantly changes relative to the reversal angle $\Phi$. If the reversal angle $\Phi$ is larger than $\Phi=180°$, the total length of the stranding curvature is located in the positive area of the x-axis, i.e., according to the bending direction totally in the compression or tension stress segment of the cable. With increasing reversal angles $180°<\Phi<360°$ the unequal weight between the lengths of the stranding curvature located in the positive and negative segments of the x-axis continually and equalizes at the desired ideal reversal angle $\Phi_0$.

The condition, where the length of the stranding curvature in the positive segment of the x-axis has to equal the length of the stranding curvature in the negative segment of the x-axis leads to the requirement $$\int_0^S T(z)_x dz \equiv 0 \quad (3)$$

where $T_x(z)$ designates the x-component of the vector $T(z)$. Considering the parameterization given in equations 1) and 2), the equation (3) can be formed into a definition equation for the ideal reversal angle $\Phi_0$.

$$\int_0^S r_0 \cdot \cos\left(\frac{\Phi_0}{2} \cdot \cos\left(\frac{z}{S} \cdot 2\pi\right)\right) dz \equiv 0 \Leftrightarrow \quad (4)$$

$$\frac{S}{2\pi} \cdot \int_0^{2\pi} r \cdot \cos\left(\frac{\Phi_0}{2} \cdot \cos(\varphi)\right) d\varphi \equiv 0$$

The integral corresponds to the Bessel function $J_0(\Phi_0/2)$ of zero power, whose zero points correspond to the desired ideal reversal angle.

FIG. 4 shows the value of the integral $I(\Phi_0)$ calculated by means of numerical integration for reversal angles in the range of $0° \leq \Phi_0 \leq 1200°$. The absolute value of the integral here depends among others on the lay length, set f.e at 500 mm. Since the lay length S does not influence the location of the zero points, the optimum reversal angles are $\Phi_0=275.5°$, $632.6°$, etc. A good approximation of possible reversal points $\Phi_0$ are located on the straight line given by $$\Phi_0=359,29°\cdot n-85.223° \quad (5)$$

d) Curving, Curving Radius and Curving Direction of the Stranding Curvature

For the central elements ZE depicted in FIGS. 1a and 1b the curving as well as the curving radius of the space curvatures describing each slot path are constant and the curving direction, i.e. the vector of the curvature normal lines in the direction of the curvature center, are pointing to the inside towards the longitudinal axis of the central element ZE (S- or Z-stranding). This basically distinguishes it from the space curvature assigned to the slot path of the SZ-stranded central element ZE and described by the tip of the vector T, whose curving, curving radius and curving direction show a relationship to location.

The location relationship looked for can be calculated analytically or numerically by means of the above mentioned parameterization, where the curving and the curving radius qualitatively show the path along the cable longitudinal axis (z-axis) within a segment with a length of S=500 mm as depicted in FIG. 5 or FIG. 6, respectively. In the equal lay area, there is maximum curving, the curving radius is therefore at a minimum. In the axis segments between two equal lay areas containing the "reversal point", it is the exact opposite, i.e. the curving is at a minimum, while the curving radius takes on a maximum value.

FIG. 7 schematically depicts the projection of curving vector k representing the curving direction, also deducted from the above mentioned parameterization, at various points of the z-axis onto the cross-section of the central element ZE. It is shown that the curving vector k is pointing tangentially to the outside at the reversal points and radially to the inside in the equal lay areas. When applying the angle a enclosed by the curving vector k and the radial unit vector 3, in relationship to the z-coordinate, the function shown in FIG. 8 is the result.

e) Optical Fiber Ribbon and Ribbon Stack

The light transmitting part of the cable is also subject to the location relationship of the curving and the curving direction given by the slot path in the central element ZE.

If this is a single optical fiber consisting of a glass core, a glass jacket and a normally multi-layer protective covering (coating), the wound slot path causes no problems. Due to its high flexibility and radial symmetry the optical fiber can easily follow the stranding curve.

An entirely different behavior is shown by the optical fiber ribbon LB, depicted in cross-section in FIG. 9, which f.e. contains 16 optical fibers LW1–LWn, aligned relative to their longitudinal axes and being held together mechanically by a plastic jacket BC. The optical fiber ribbon LB has two main axes with different bending behavior, where the so-called weak bending axis (ribbon easily bendable) is oriented vertically to the ribbon longitudinal axis and is located in the level fixed by the ribbon LB; and the stiff bending axis (ribbon difficult to bend),which is vertical to the ribbon longitudinal axis as well as the weak bending axis. If such a ribbon is inserted into a slot showing the above mentioned curvature path, a very complex state of stress is created.

A behavior similar to ribbon LB is shown in the ribbon stack BS shown in cross-section in FIG. 10. In the construction sample shown, the stack BS consists of five individual ribbons LB1–LB5, situated above one another and being parallel, each of them having four optical fibers serving as signal conductors. The stack BS has two main axes with different bending resistance just like the individual ribbons LBi. In FIG. 10, the weak bending axis is designated as k, the stiff bending axis as 1.

In order to minimize the shear and normal forces (tensile and compression forces) in a straight cable, the light transmitting elements are inserted into a sufficiently large slot allowing free rotation of the optical fiber ribbons LBi. Due to their stiffness the optical fiber ribbons LBi perform a back rotation in the slot, which is countered by the torsion around the ribbon longitudinal axis which is forced upon it by the slot path. This back rotation leads to a preferred alignment of the ribbons LBi in the slot in such a way, that the stiff bending axis of the ribbons LBi points nearly in the direction of the y-axis in the chosen coordinate system. As shown in FIG. 11, the ribbon stack BS at the helical "stands" therefore vertically in the slot, while taking a rather "lying-down" position in the two adjacent reversal points. Due to this back rotation only the middle ribbon LB (ribbon No. 3) of the stack BS shows the ideal reversal angle $\Phi_0$. For the ribbons No. 1 and 2 the reversal angle is greater, for the ribbons No. 4 and 5 it is smaller than the ideal value. As explained above, the two outer ribbons (ribbons No. 1/2 and No. 4/5) are therefore not completely stranded in this configuration, i.e. in the case of a bending of the cable they are subjected to compression and tensile stresses leading to attenuation increases.

FIG. 12 shows the sum of compression and elongation energy relative to the bending radius building up in the individual ribbons during bending of the central element ZE around the y-axis. Due to the incomplete stranding the uppermost and lowest ribbons (ribbon No. 1 and 5) are stressed the most in the stack; the middle ribbon (ribbon No. 3) the least.

During a bending of the central element ZE around the x-axis, the ribbons LBi are stressed over their stiff bending axis (axis 1 in FIG. 10). Since the ribbons LBi are loosely arranged in the slot, they can avoid this stress by a rotation around the z-axis. As indicated in FIG. 13, the ribbons LBi, beginning from the situation shown in the left part of FIG. 13, take up finally the position, shown in the right part of FIG. 13 within the slot at the adjacent reversal points and the helical located between them.

In the corresponding energy diagram (see FIG. 14), instability is detected for bending radii smaller than 0.4 mm, i.e. the built-up mechanical tension is removed by a spontaneous rotation of the ribbons BLi around the z-axis. This disturbs the arrangement of the ribbons LBi in the stack BS, which in turn leads to attenuation increase.

f) Twisted and Straight Insertion of Ribbons into the Slot

The above described disadvantages are based on the back rotation behavior of the ribbons LB and the resulting preferred alignment of the ribbon stack BS in the slot. The preferred alignment can be kept by layering an equal length stranding over the torsion (SZ-stranding) inflicted on the ribbon LB by the slot path. This can be done by an additional synchronous rotation of the ribbon stack BS around its longitudinal axes, where the rotation angle is $2\pi$ it per SZ lay length S.

During stranding with additional lay the type of insertion of the ribbons LB into the slot K is of great importance. There is a distinction between "twisted" insertion and "straight" insertion; these concepts have the following meaning:

Twisted Insertion

The ribbon stack BS is arranged in the slot K at the helicals in such a way, that the weak bending axis k of the stack BS or the ribbons LBi, respectively, and the x-axis of the previously defined coordinate system run parallel, or the weak bending axis k of the stack BS is standing vertically on the level defined by the floor of the slot (the stack BS lies at the helical of the slot; compare FIG. 16a).

Straight Insertion

The stiff bending axis 1 of the ribbon stack BS or the ribbons BLi, respectively, and the x-axis run parallel (the stack "stands" at the helical in the slot; compare FIG. 16b).

Both insertion types are differentiated not in regard of the torsion around the stack longitudinal axis occasioned by the additional lay, but solely in regard to the orientation of the ribbon stack BS within the slot at the helicals. It can be seen at once in FIG. 16, that all ribbons LBi of the stack BS only show the ideal reversal angle $\Phi_0$, when the stack BS is inserted "twisted".

FIGS. 17 and 18 depict a ribbon stack BS, corresponding to the energy diagrams in FIGS. 12 and 14, being inserted twisted, SZ-stranded and additionally twisted around its longitudinal axis ($2\pi$ per lay length S), where FIG. 17 depicts the stress of the ribbons LBi during bending of the central element ZE around the y-axis, and FIG. 18 the stress of the ribbons BLi during bending of the central element ZE around the x-axis. All relevant parameter for the calculation of the energy levels were unchanged except of the equal lay stranding applied over the SZ-stranding.

Due to the additional stranding applied to the optical fiber ribbons LB, they behave nearly identical during bending around an orthogonal axis (compare the path of the curves and ordinate values depicted in FIGS. 17 and 18), i.e. the bending behavior of the ribbons is relative to direction and therefore nearly ideal. The energy levels assigned to the individual ribbons are very close together within the examined area of the bending radii, which indicates an equal stress of the ribbons LB. The stress is also comparatively small, since the energy level assigned to the smaller bending radii (r<0.25 m) is only slightly higher than the beginning level. There is also no instability in any of the energy diagram.

g) Process for the Manufacture of an SZ-stranded Slotted Core Cable with Additional Lay As has just been explained, the preferred alignment of the ribbons LB in slot K can be offset by an equal lay applied over the SZ-stranding. For the manufacture of such a cable, the device known from (3) and clearly described there, for the manufacture of an SZ-stranded slotted core cable has to be modified. Since the modification concerns only the ribbon payoff and the insertion tool normally designated as "finger", the other components and elements of the production line can be ignored in the following.

As shown schematically in FIG. 19, the ribbon payoff in the production line assigned to a slot K in the central element ZE in the construction shown consists of a total of 5 storage reels (VS1–VS5) fastened to a frame not shown and each being rotated around their longitudinal axis. The ribbons LB1–LB5 payed off these storage reels VS1–VS5 are brought into proximity to each other, perhaps threaded into a guide tube and inserted by a longitudinally stretched finger F with f.e. O-like or circular cross-section as stack BS in the corresponding slot K of the central element ZE (see enlarged segment in the right part of FIG. 19). The central element ZE and the steel wire S guaranteeing the tension resistance of the cable move with constant line or payoff speed VL along the z-axis. At the same time, the steel wire S, the central element ZE, the finger F and the ribbon payoff, designated by double arrows perform a harmonic oscillation in the stranding angle $\phi_0$ around the z-axis.

In order to produce the additional lay of the ribbons LB, all storage reels VS1–VS5 rotate during payoff synchronously with the constant angle speed $$\omega_s = (2\pi/S) \cdot v_L \tag{6}$$

where S and $v_L$ are:
S: SZ lay length
$v_L$: payoff speed
around a rotation axis standing vertical on the longitudinal axis of the storage reels VS1–VS5. With a payoff speed of typically $v_L$=20 m/min and a lay length of f.e. S=0.5 m the angle speed $\omega_s$ of the storage reels VS1–VS5 are $\omega s$=4 s$^{-1}$.

After the simultaneous insertion of each ribbon stack BS in the f.e. 8 slots, the central element ZE is surrounded by a so-called swell fleece or a webbing and subsequently provided with a single or multi-layer plastic jacket made of PE or PP. The swell fleece is supposed to seal the slots to the outside, in case of water penetration into the cable core due to a damaged jacket. Additionally, the swell fleece avoids the spreading of the water in the inside of the cable.

As shown in FIG. 20, the cable OK produced by such a process can consist f.e. of a compression resistant element S (steel wire, glass fiber reinforced plastic rod, ARP (aramid reinforced plastics) rod) a spoke-like PE central element ZE showing six slots K, a swell fleece QF or a determination and single layer PE outer jacket MA. The measurements of the slots K are done in such a way, that the ribbon stack BS can rotate freely in its slot K. The slot K can show a trapezoid or a nearly circular cross-section. The ribbon stack BS being inserted twisted describes the space curvature between adjacent reversal points given by the path of the slot in central element ZE, as shown in FIG. 21.

Accordingly, what is claimed is:

1. A cable containing optical transmission elements comprising:
    a central element (ZE), the central element (ZE) stretching in the direction of a cable longitudinal axis (z), where the central element (ZE) has at least one slot (K) open to the outside and where the slot (K) runs on the outside of the central element (ZE) in a SZ orientation having a periodically changing rotation direction;
    a plurality of optical fiber ribbons (LB), the plurality of optical fiber ribbons (LB) being arranged inside the slot in a ribbon stack, where an additional equal lay stranding is applied to the SZ-stranding imposed by the slot path; and
    a jacket surrounds the central element ZE.

2. The cable according to claim 1, wherein the equal lay stranding is formed by the continuous rotation of the plurality of optical fiber ribbons (LB) about a ribbon stack longitudinal axis, where the rotation about the ribbon stack longitudinal axis is about 360° per lay length S of the slot (K) with the SZ orientation.

3. The cable according to claim 2, wherein the ribbon stack (BS) at locations near about the center of subsequent reversal points is arranged in the slot (K) in such a way, that axis (K) of the optical fiber ribbons (LB), which is less stiff relative to bending behavior, is essentially vertical to the slot floor.

4. The cable according to claim 1, wherein a space curvature connecting the center points of the slot along the cable longitudinal axis being given by $$T(z)_{xy} = \begin{bmatrix} ro \cdot \cos\left(\Phi_0/2 \cdot \cos\left(\frac{z}{S} \cdot 2\pi\right)\right) \\ ro \cdot \sin\left(\Phi_0/2 \cdot \cos\left(\frac{z}{S} \cdot 2\pi\right)\right) \\ z \end{bmatrix}$$

and that a projection of a vector, originating from the cable longitudinal axis, pointing to the outside to the center of the slot sweeping over the angle $\Phi_0$ onto a level vertical to the cable longitudinal axis between subsequent reversal points, where the angle $\Phi_0$ of the condiction $$\int_0^s T(z)_x dz \equiv 0$$

is sufficient.

5. The cable according to claim 4, wherein the angle $\Phi_0$ is selected from one of the values $\Phi_0$=275.5°±0.5° and $\Phi_0$=632.5°±0.5°.

6. The cable according to claim 1, wherein the central element (ZE) includes a plurality of slots (K).

7. The cable according to claim 1, wherein the cable includes a wrapping or webbing which swells when water penetrates, thereby inhibiting the migration of water along the cable.

8. The cable according to claim 1, wherein the central element (ZE) includes a core element (S).

9. A process for the manufacture of a cable containing optical transmission elements comprising the following steps:
    providing a central element (ZE), the central element (ZE) having at least one slot (K), wherein the slot (K) runs at the outside of the central element (ZE) in a S-Z orientation having a changing rotational direction,
    paying off a plurality of optical fiber ribbons serving as transmission elements from a plurality of respective reels,
    combining the plurality of optical fiber ribbons into a ribbon stack (BS),
    rotating the ribbon stack (BS) with a constant angular speed about a ribbon stack longitudinal axis,
    inserting the ribbon stack (BS) rotating with a constant angular speed into the slot (K), and
    extruding a jacket (MA) about the central element (ZE).

10. The process according to claim 9, wherein the ribbon stack (BS) rotates with angular speed of about $\omega_3$=(2$\pi$/S)·$v_L$ about the ribbon stack longitudinal axis during insertion, where the value S designates the lay length of the SZ-stranding forced onto the ribbon stack (BS) by the path of the slots (K) and the value $v_L$ designates the payoff speed of the central element (ZE).

11. The process according to claim 10, wherein each of the plurality of respective reels rotates with an angular speed of about $\omega_s$ around a second axis enabled by a rotating axis vertical to the payoff of the respective optical fiber ribbon.

12. The process according to claim 10, wherein a tool (F) is used for guiding the ribbon stack and inserting it into the slot (K) and tool (F) rotates with the angular speed of about $\omega_3$=(2$\pi$/S)·$v_L$.

* * * * *